United States Patent
Nakamura et al.

(10) Patent No.: US 11,909,459 B2
(45) Date of Patent: Feb. 20, 2024

(54) CONGESTION DEGREE ESTIMATION METHOD USING PROPAGATION LOSS OF WIRELESS COMMUNICATION, ESTIMATION DEVICE AND ESTIMATION PROGRAM

(71) Applicant: NIPPON TELEGRAPH AND TELEPHONE CORPORATION, Tokyo (JP)

(72) Inventors: Mitsuki Nakamura, Musashino (JP); Wataru Yamada, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 371 days.

(21) Appl. No.: 17/289,214

(22) PCT Filed: Oct. 21, 2019

(86) PCT No.: PCT/JP2019/041290
§ 371 (c)(1),
(2) Date: Apr. 27, 2021

(87) PCT Pub. No.: WO2020/090540
PCT Pub. Date: May 7, 2020

(65) Prior Publication Data
US 2022/0014285 A1    Jan. 13, 2022

(30) Foreign Application Priority Data

Oct. 29, 2018   (JP) ................................ 2018-202849

(51) Int. Cl.
*H04B 17/318*    (2015.01)
*G08G 1/01*      (2006.01)
*G01S 11/06*     (2006.01)

(52) U.S. Cl.
CPC .......... *H04B 17/318* (2015.01); *G01S 11/06* (2013.01); *G08G 1/0108* (2013.01)

(58) Field of Classification Search
CPC ...... H04B 17/318; G01S 11/06; G08G 1/0108
(Continued)

(56) References Cited

U.S. PATENT DOCUMENTS

2020/0120612 A1*  4/2020  Sun ..................... H04W 52/242

OTHER PUBLICATIONS

Mitsuki Nakamura et al., Path Loss Characteristics of Multiple Human Body Shadowing between Tx and Rx, IEICE General Conference, 2016.

* cited by examiner

*Primary Examiner* — Faisal Choudhury
(74) *Attorney, Agent, or Firm* — Harness, Dickey & Pierce, P.L.C.

(57) ABSTRACT

The following are executed: received power acquisition processing; propagation loss calculation processing of calculating propagation losses between the transmitter and the receiver, based on received power; median processing of calculating a median of a plurality of the propagation losses calculated in the propagation loss calculation processing in a predetermined time period, and outputting the median as propagation losses to be used for subsequent processing; loss peak acquisition processing of acquiring a maximum value of the propagation losses output in the median processing; distance calculation processing of calculating a distance between the transmitter or the receiver and blocking entities, at least based on the maximum value, heights of antennas, and a wavelength of the radio communication; and congestion degree calculation processing of estimating a congestion degree by calculating the number of the blocking entities in chronological order, based on the distance, inte- (Continued)

grating the number for a predetermined time period, and thereby calculating the number of the blocking entities per unit area.

2 Claims, 10 Drawing Sheets

(58) Field of Classification Search
 USPC .......................................................... 370/252
 See application file for complete search history.

CONGESTION DEGREE ESTIMATION METHOD USING PROPAGATION LOSS OF WIRELESS COMMUNICATION, ESTIMATION DEVICE AND ESTIMATION PROGRAM

CROSS-REFERENCE TO RELATED APPLICATIONS

This application is a 371 U.S. National Phase of International Application No. PCT/JP2019/041290 filed on Oct. 21, 2019, which claims priority to Japanese Application No. 2018-202849 filed on Oct. 29, 2018. The entire disclosures of the above applications are incorporated herein by reference.

TECHNICAL FIELD

The present invention relates to a technique of estimating a degree of congestion of humans, vehicles, or the like in a measurement environment by acquiring propagation losses of radio communication.

BACKGROUND ART

In a congested environment with a large number of humans, vehicles, or the like, the number of humans, vehicles, or the like has hitherto been measured based on an image captured by a camera in order to quantitatively evaluate a degree of the congestion (hereinafter also referred to as a congestion degree).

CITATION LIST

Non Patent Literature

NPL 1: Mitsuki Nakamura, Motoharu Sasaki, Naoki Kita, and Takeshi Onizawa, "Path Loss Characteristics of Multiple Human Body Shadowing between Tx and Rx", IEICE General Conference, B-1-37, 2016.

SUMMARY OF THE INVENTION

Technical Problem

However, at a place where it is difficult to set a camera at a high position, there is a problem that humans, vehicles, or the like block a camera view and a state ahead thereof cannot be checked. Further, at a place where it is difficult to set a camera in view of protection of privacy, a state cannot be checked with an image captured by the camera, and accordingly it is difficult to measure the congestion degree of humans and vehicles.

Given this, NPL 1 discloses an estimation model for shadowing losses due to human bodies when a communication region between a transmitter and a receiver is blocked by a plurality of human bodies in a radio communication system using a high-frequency band of 6 GHz or higher. However, a technique that can be applied to measurement of a congestion degree of humans and vehicles is not taken into consideration.

An object of the present invention is to provide an estimation method, an estimation apparatus, and an estimation program that allow for estimation of a congestion degree of humans, vehicles, or the like in a target area by acquiring propagation losses of radio communication in the target area.

Means for Solving the Problem

A first aspect of the invention is an estimation method of estimating a congestion degree of blocking entities in a communication region between a transmitter and a receiver performing radio communication The estimation method includes: acquiring received power; calculating propagation losses between the transmitter and the receiver, based on the received power acquired in the acquiring of the received power; calculating a median of a plurality of the propagation losses calculated in the calculating of the propagation losses in a predetermined time period determined in advance, and outputting the median as propagation losses to be used for subsequent processing; acquiring a loss peak by acquiring a maximum value of the propagation losses output in the calculating of the median; calculating a distance between the transmitter or the receiver and the blocking entities, at least based on the maximum value of the propagation losses acquired in the acquiring of the loss peak, heights of antennas of the transmitter and the receiver, and a wavelength of the radio communication; and calculating the congestion degree by estimating the congestion degree by calculating the number of the blocking entities in chronological order, based on the distance calculated in the calculating of the distance, integrating the number for a predetermined time period determined in advance, and thereby calculating the number of the blocking entities per unit area.

A second aspect of the invention is an estimation method of estimating a congestion degree of blocking entities in a communication region between a transmitter and a receiver performing radio communication. The estimation method includes: acquiring received power; calculating propagation losses between the transmitter and the receiver, based on the received power acquired in the acquiring of the received power; calculating a median of a plurality of the propagation losses calculated in the calculating of the propagation losses in a predetermined time period determined in advance, and outputting the median as propagation losses to be used for subsequent processing; performing distribution comparison by calculating distribution of the propagation losses, based on output results of the calculating of the median, performing comparison between the calculated distribution and a plurality of pieces of distributed data that are associated with the number of the blocking entities per unit area and that are stored in advance, and selecting a piece of the distributed data with closest propagation losses; and calculating, based on the piece of the distributed data of the propagation losses selected in the performing of the distribution comparison, the number of the blocking entities per unit area associated with the selected piece of the distributed data, and outputting the calculated number as the congestion degree of the blocking entities between the transmitter and the receiver.

A third aspect of the invention is an estimation apparatus configured to estimate a congestion degree of blocking entities in a communication region between a transmitter and a receiver performing radio communication. The estimation apparatus includes: a received power acquisition unit configured to acquire received power; a propagation loss calculation unit configured to calculate propagation losses between the transmitter and the receiver, based on the received power acquired by the received power acquisition unit; a median processing unit configured to calculate a median of a plurality of the propagation losses calculated by the propagation loss calculation unit in a predetermined time period determined in advance, and output the median as propagation losses to be used for subsequent processing; a loss peak acquisition unit configured to acquire a maximum value of the propagation losses output by the median processing unit; a distance calculation unit configured to calculate a distance between the transmitter or the receiver and the blocking entities, at least based on the maximum value of the propagation losses acquired by the loss peak acquisition unit, heights of antennas of the transmitter and the receiver, and a wavelength of the radio communication; and a congestion degree calculation unit configured to estimate the congestion degree by calculating the number of the blocking entities in chronological order, based on the distance calculated by the distance calculation unit, integrating the number for a predetermined time period determined in advance, and thereby calculating the number of the blocking entities per unit area.

A fourth aspect of the invention is an estimation apparatus configured to estimate a congestion degree of blocking entities in a communication region between a transmitter and a receiver performing radio communication. The estimation apparatus includes: a received power acquisition unit configured to acquire received power; a propagation loss calculation unit configured to calculate propagation losses between the transmitter and the receiver, based on the received power acquired by the received power acquisition unit; a median processing unit configured to calculate a median of a plurality of the propagation losses calculated by the propagation loss calculation unit in a predetermined time period determined in advance, and output the median as propagation losses to be used for subsequent processing; a distribution comparison unit configured to calculate distribution of the propagation losses, based on output results of the median processing unit, perform comparison between the calculated distribution and a plurality of pieces of distributed data that are associated with the number of the blocking entities per unit area and that are stored in advance, and select a piece of the distributed data with closest propagation losses; and a congestion degree output unit configured to calculate, based on the piece of the distributed data of the propagation losses selected by the distribution comparison unit, the number of the blocking entities per unit area associated with the selected piece of the distributed data, and output the calculated number as the congestion degree of the blocking entities between the transmitter and the receiver.

A fifth aspect of the invention is a program configured to cause a computer to execute processing performed in the estimation apparatus according to the third or fourth invention.

Effects of the Invention

The estimation method, the estimation apparatus, and the estimation program for the congestion degree according to the present invention allow for estimation of the congestion degree of humans, vehicles, or the like in a target area by acquiring propagation losses in radio communication in the target area.

DESCRIPTION OF EMBODIMENTS

Embodiments of an estimation method, an estimation apparatus, and an estimation program for a congestion degree according to the present invention will be described below with reference to the drawings. Here, the estimation method, the estimation apparatus, and the estimation program for estimating a congestion degree according to the present invention allow for measurement of a congestion degree of humans and vehicles through the use of an existing radio communication system even in a high place at which it is difficult to set a camera, a place where blocking entities cannot be detected using image recognition in view of protection of personal information, and the like.

Figure 1:
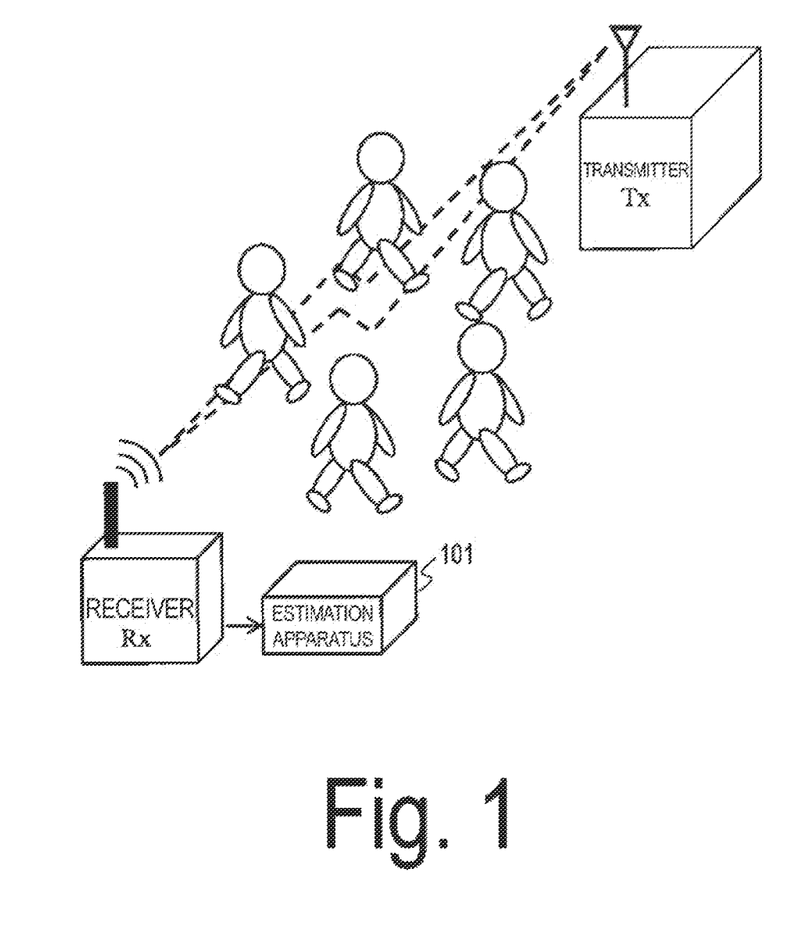
FIG. 1 is a diagram illustrating an example of an estimation model for shadowing losses due to human bodies when a communication region between a transmitter and a receiver is blocked by a plurality of human bodies.

FIG. 1 illustrates an example of an estimation model for shadowing losses due to human bodies when a communication region between a transmitter Tx and a receiver Rx is blocked by a plurality of human bodies. In FIG. 1, a radio signal transmitted from the transmitter Tx is received by the receiver Rx. Further, in the present embodiment, an estimation apparatus 101 connected to the receiver Rx calculates propagation losses based on received power of the receiver Rx, and thereby estimates a congestion degree of blocking entities such as humans and vehicles, in a target area between the transmitter Tx and the receiver Rx. Here, the present embodiment is based on the assumption that the type of blocking entities such as humans and vehicles is known in advance, and it is not assumed that various blocking entities coexist. Thus, for example, the estimation apparatus 101 according to the present embodiment can be used for, for example, estimation of a congestion degree of humans in an event site and a congestion degree of vehicles in a parking lot or the like. Note that, in FIG. 1, the estimation apparatus 101 is connected to the receiver Rx as an independent apparatus. However, the estimation apparatus 101 may be incorporated into the receiver Rx. Further, the estimation apparatus 101 may cooperate with the transmitter Tx to cause the transmitter Tx to transmit a known signal with transmit power, a modulation scheme, or the like of the transmitter Tx controlled.

In the example of FIG. 1, the propagation losses vary due to the traffic of a plurality of humans between the transmitter Tx and the receiver Rx, and the received power in the receiver Rx thus varies as well. In view of this, in the present embodiment, the estimation apparatus 101 acquires the received power in the receiver Rx, and calculates the propagation losses between the transmitter Tx and the receiver Rx. Then, the estimation apparatus 101 calculates a distance from the blocking entities based on the propagation losses, and calculates a congestion degree in the target area.

First Embodiment

Figure 2:
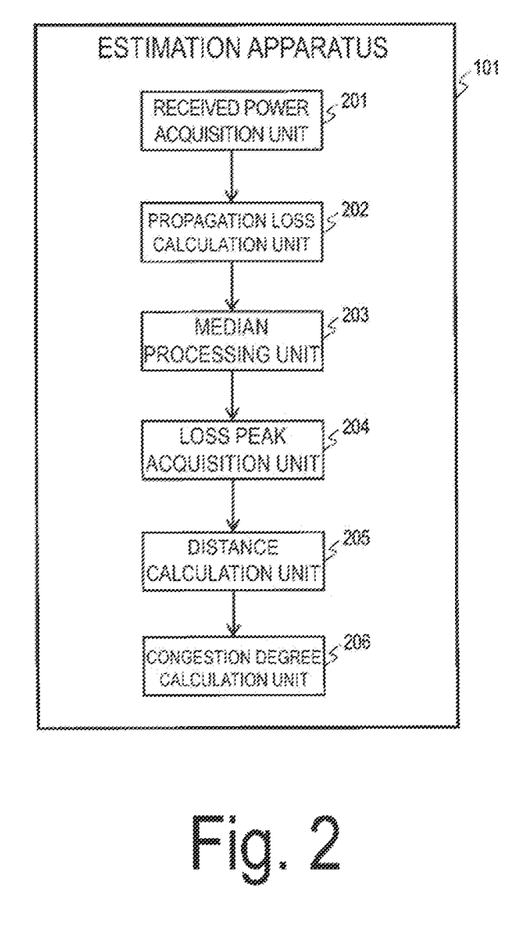
FIG. 2 is a diagram illustrating an example of an estimation apparatus according to a first embodiment.

FIG. 2 illustrates an example of the estimation apparatus 101 according to a first embodiment. The estimation apparatus 101 includes a received power acquisition unit 201, a propagation loss calculation unit 202, a median processing unit 203, a loss peak acquisition unit 204, a distance calculation unit 205, and a congestion degree calculation unit 206.

The received power acquisition unit 201 receives a radio signal transmitted from the transmitter Tx and acquires received power. Here, the radio signal may be an unmodulated carrier signal or a modulated signal. Note that the height and the transmit power of an antenna of the transmitter Tx, the height of an antenna of the receiver Rx, and a distance between the transmitter Tx and the receiver Rx are determined at the time of setup, and are herein known parameters.

The propagation loss calculation unit 202 calculates propagation losses between the transmitter Tx and the receiver Rx, based on the received power of the receiver Rx. Here, received power P0 of the receiver Rx obtained when there are no blocking entities are measured and stored in advance. This enables the propagation losses between the transmitter Tx and the receiver Rx to be calculated as a difference (P0−Pr), which is a difference between the received power P0 and received power Pr of the receiver Rx obtained when there is a blocking entity.

The median processing unit 203 calculates a median of the propagation losses calculated by the propagation loss calculation unit 202 in a predetermined time period determined in advance. This is processing for removing the influence of fading. The median of the plurality of propagation losses acquired within the predetermined time period is derived, and subsequent processing is performed by using the median propagation losses. Here, this predetermined time period is desirably equal to or longer than an expected period of fading, such as several seconds.

The loss peak acquisition unit 204 acquires propagation losses having a maximum value (also referred to as a loss peak) out of the propagation losses in the predetermined time period output by the median processing unit 203. This is performed to acquire the propagation losses when the blocking entities, which are moving entities such as humans or vehicles, cross the straight line connecting the transmitter Tx and the receiver Rx. In this manner, by acquiring the maximum value of the propagation losses, the positions of the blocking entities can be accurately estimated. If the maximum value of the propagation losses is not used, the propagation losses due to the blocking entities are calculated to be a lower value than the actual value, which may cause an error when a distance from the blocking entities is calculated based on the propagation losses.

The distance calculation unit 205 calculates a distance from the blocking entities, based on the maximum value of the propagation losses acquired by the loss peak acquisition unit 204. Note that a method of calculating the distance from the blocking entities will be described later in detail.

The congestion degree calculation unit 206 stores data of the distances from the blocking entities calculated by the distance calculation unit 205 for a predetermined time period determined in advance, and estimates a congestion degree of the blocking entities such as humans and vehicles between the transmitter Tx and the receiver Rx. Note that a method of calculating the congestion degree of the blocking entities will be described later in detail.

In this manner, the estimation apparatus 101 according to the present embodiment calculates the propagation losses due to the blocking entities such as humans and vehicles based on the received power of the receiver Rx through the use of radio communication between the transmitter Tx and the receiver Rx. Further, the estimation apparatus 101 can estimate the congestion degree between the transmitter Tx and the receiver Rx by calculating the distance between the transmitter Tx or the receiver Rx and the blocking entities.

Here, the estimation apparatus 101 according to the present embodiment is described as an apparatus including each of the blocks illustrated in FIG. 2. However, the estimation apparatus 101 can be also implemented by a computer that executes a program corresponding to the processing performed by each of the blocks. Note that the program may be provided being recorded on a recording medium, or may be provided via a network.

Method of Calculating Distance from Blocking Entities

Next, a method of calculating a distance from the blocking entities performed by the distance calculation unit 205 will be described. Here, in the present embodiment, the calculation is performed by modeling the blocking entity as a rectangular screen.

Figure 3:
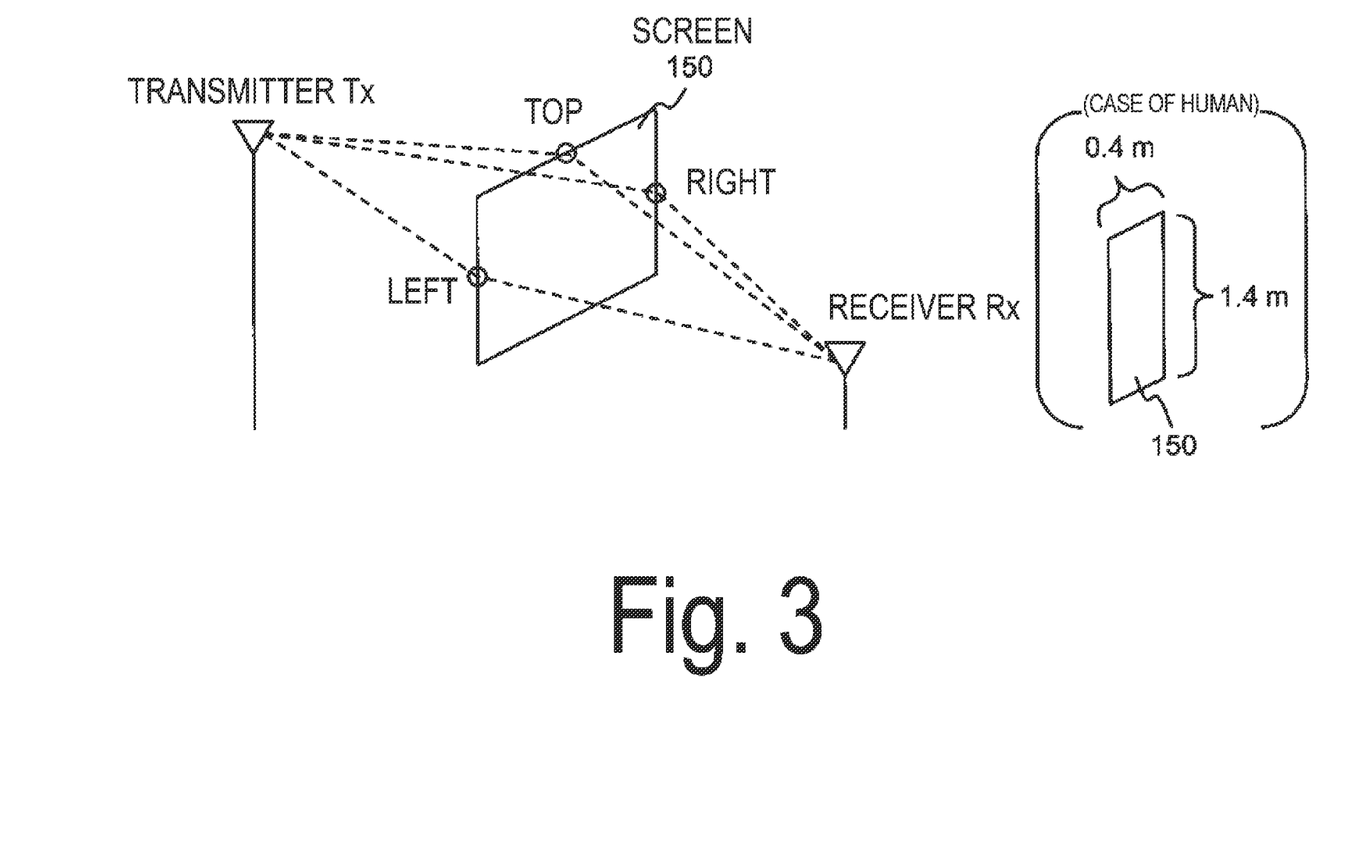
FIG. 3 is a diagram illustrating an example of a screen.

FIG. 3 illustrates an example of the screen. In FIG. 3, for example, in a case of a human, a screen 150 is modeled to have a size with a height of 1.4 m and a width of 0.4 m. Then, the propagation losses are calculated by using diffraction losses with three edges, namely a top end, a right end, and a left end, of the screen 150 disposed at a position of the blocking entity between the transmitter Tx and the receiver Rx being used as diffraction ends.

Figure 4:
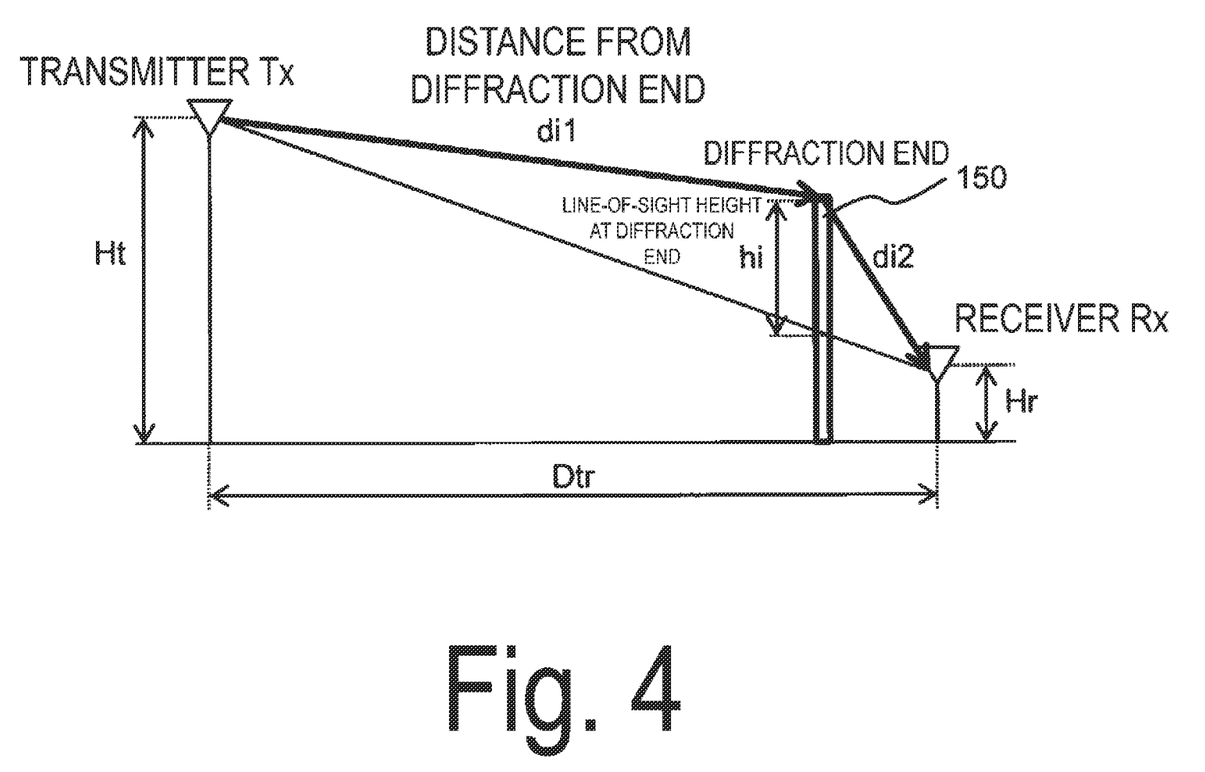
FIG. 4 is a diagram illustrating an example of parameters of a blocking model.

FIG. 4 illustrates an example of parameters of the blocking model illustrated in FIG. 3. In FIG. 4, Ht represents the height of the antenna of the transmitter Tx, Hr represents the height of the antenna of the receiver Rx, and Dtr represents the distance between the transmitter Tx and the receiver Rx. Further, the radio wave transmitted from the transmitter Tx is diffracted at one of the diffraction ends (in FIG. 4, a top end edge is illustrated) of the screen 150, and is then received by the receiver Rx. In this case, a distance from the antenna of the transmitter Tx to the diffraction end is represented by $d_{i1}$, and a distance from the diffraction end to the antenna of the receiver Rx is represented by $d_{i2}$. Further, in FIG. 4, the height from the position at which the straight line between the antenna of the transmitter Tx and the antenna of the receiver Rx intersects the screen 150 to the diffraction end is defined as a line-of-sight height $h_i$ at the diffraction end.

Next, with the use of the parameters described with reference to FIG. 4, a method of calculating a relationship between shadowing losses due to the screen 150 (corresponding to the propagation losses) and the distance between the screen 150 and the transmitter Tx or the receiver Rx will be described.

Here, in FIG. 3, it is assumed that $j_1(v)$ represents diffraction losses at the top end edge, $j_2(v)$ represents diffraction losses at the left end edge, $j_3(v)$ represents diffraction losses at the right end edge, and the total diffraction losses are the shadowing losses. In this case, shadowing losses $J(v)$ [dB] due to the blocking entity (screen 150) are calculated according to the following equation.

[Math. 1]

$$J(v)[\text{dB}] = -20\log\left[\frac{1}{j_1(v)} + \frac{1}{j_2(v)} + \frac{1}{j_3(v)}\right] \quad (1)$$

Here, v is a diffraction parameter commonly used in the knife edge diffraction model, for example. If the knife edge is located on the line of sight between the transmitter Tx and the receiver Rx, v is equal to zero.

Note that $j_i(v)$ is converted from decibels to an actual value according to the following equation.

[Math. 2]

$$j_i(v) = 10^{J_i(v)\,[dB]/20} \quad (2)$$

Further, it is known that the diffraction losses at each of the top end edge, the left end edge, and the right end edge can be calculated according to the following equation (see NPL 1).

[Math. 3]

$$J_i(v)\,[\text{dB}] = 6.9 + 20\,\log(\sqrt{(v_i-0.1)^2+1}+v_i-0.1) \quad (3)$$

Here, the equation shows the diffraction losses $J_1(v)$ at the top end edge when i is equal to 1, the equation shows the diffraction losses $J_2(v)$ at the left end edge when i is equal to 2, and the equation shows the diffraction losses $J_3(v)$ at the right end edge when i is equal to 3.

Here, the diffraction parameter $v_i$ is expressed as in Equation (4).

[Math. 4]

$$v_i = h_i\sqrt{\frac{2}{\lambda}\left(\frac{1}{d_{i1}} + \frac{1}{d_{i2}}\right)} \quad (4)$$

Note that λ represents a wavelength of a radio wave, $h_i$ represents a line-of-sight height at the diffraction end (height from a point on the straight line connecting the transmitter Tx and the receiver Rx to the diffraction end), $d_{i1}$ represents a distance from the transmitter Tx to the diffraction end, and $d_{i2}$ represents a distance from the diffraction end to the receiver Rx.

In this manner, by using Equation (1) to Equation (4), the relationship between the shadowing losses (J(v)) of the screen 150 and the distance ($d_{i1}$ or $d_{i2}$) from the transmitter Tx or the receiver Rx can be calculated. Here, under the presumption that the shadowing losses of the screen 150 correspond to the propagation losses between the transmitter Tx and the receiver Rx, the distance (position) from the screen 150 can be estimated by acquiring the propagation losses.

Next, a method of acquiring the propagation losses between the transmitter Tx and the receiver Rx will be described. Here, the propagation losses between the transmitter Tx and the receiver Rx can be calculated as a difference (P0−Pr), which is a difference between the received power P0 in the receiver Rx obtained when there are no blocking entities and the received power Pr in the receiver Rx obtained when there is a blocking entity. However, there is a problem that, because the received power in the receiver Rx varies due to the influence of fading and the like, the calculated propagation losses vary as well. In view of this, in the present embodiment, to remove the influence of fading, the median processing unit 203 performs processing of selecting a median of the propagation losses acquired within a predetermined time period determined in advance, and the value of the propagation losses selected as the median is used in each subsequent processing.

Figure 5:
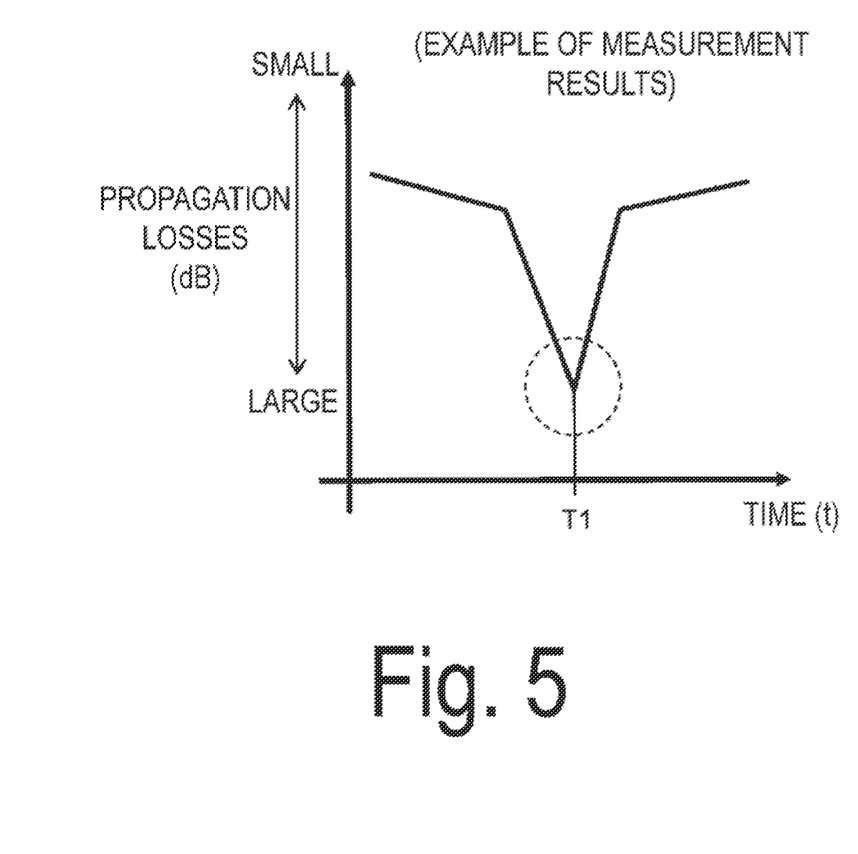
FIG. 5 is a diagram illustrating an example of processing of a loss peak acquisition unit.

FIG. 5 illustrates an example of processing of the loss peak acquisition unit 204. In FIG. 5, the horizontal axis represents time (t), and the vertical axis represents median propagation losses (dB) selected by the median processing unit 203. Note that, FIG. 5 illustrates an example in which the propagation losses vary over time, and the propagation losses reach a maximum (peak value) at the part indicated by the dotted circle (time T1). In other words, provided that the blocking entities (humans in the example of FIG. 1) between the transmitter Tx and the receiver Rx are moving, the blocking of the communication between the transmitter Tx and the receiver Rx due to the blocking entities is weak before the time T1, then the straight line connecting the transmitter Tx and the receiver Rx is completely blocked at the time T1, and the blocking becomes weaker again and the propagation losses become smaller after the time T1.

Here, the relationship between the shadowing losses (propagation losses) and the distance from the transmitter Tx or the receiver Rx described with reference to Equation (1) to Equation (4) is based on the assumption that the blocking entities are located on the straight line connecting the transmitter Tx and the receiver Rx. When the blocking entities are not located on the straight line connecting the transmitter Tx and the receiver Rx (for example, when the blocking entities are slightly shifted from the straight line), the propagation losses are smaller. Accordingly, it is more difficult to accurately estimate the distance from the transmitter Tx or the receiver Rx to the blocking entities. In view of this, in the present embodiment, the loss peak acquisition unit 204 determines a time at which the propagation losses have a maximum value, and calculates the distance between the blocking entities and the transmitter Tx or the receiver Rx by using the propagation losses obtained at the time.

Note that, in the above description, the distance from the blocking entities is calculated based on the propagation losses by using Equation (1) to Equation (4). However, a data table may be created in advance for each size of the screen 150 by calculating a relationship between the propagation losses and the distances from the blocking entities by using Equation (1) to Equation (4). In this manner, simply by acquiring maximum propagation losses by performing median processing on the propagation losses calculated based on the received power in the receiver Rx, the estimation apparatus 101 can estimate the distance from the blocking entities by referring to the data table calculated in advance.

Method of Calculating Congestion Degree of Blocking Entities

Next, a method of calculating the congestion degree will be described.

Figure 6:
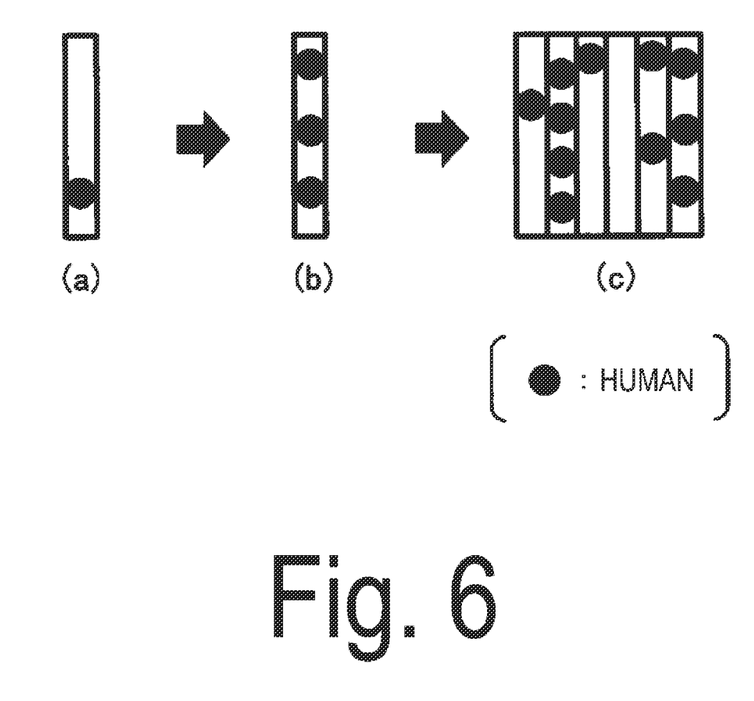
FIG. 6 is a diagram illustrating an example of blocking entities detected in chronological order.

FIG. 6 illustrates an example of blocking entities detected in chronological order. Here, in FIG. 6, the congestion degree calculation unit 206 acquires the number of blocking entities in a predetermined range (rectangular box region in FIG. 6) with the same distance from the transmitter Tx or the receiver Rx.

FIG. 6(a) is an example of a blocking entity (here, a "human") that is detected at a certain time, and illustrates that there is one "human" at a detected position. The box region of FIG. 6(a) has, for example, a short side of 1 m and a long side of 10 m. Here, when the difference in the distance of each detected blocking entity from the transmitter Tx or the receiver Rx falls within a range of ±0.5 m, these blocking entities are regarded as blocking entities with the same distance. Thus, the length of the short side of the box region in this case is 1 m. Further, the length of the long side of the box region corresponds to the range with the same distance from the transmitter Tx or the receiver Rx, and is set to, for example, 10 m in advance. In FIG. 6(a), one "human" is detected in the box region of 10 m² with a short side of 1 m and a long side of 10 m, and thus the number of humans per unit area (congestion degree) is calculated as follows: 1÷10=0.1.

In FIG. 6(b) is an example of "humans" detected within a predetermined time period in the same region as FIG. 6(a), and three "humans" are detected. Here, for example, when the humans detected in FIG. 6(a) walk at the same speed in the region, the same human is detected a plurality of times at regular intervals within the predetermined time period (for example, within 10 seconds). In the example of FIG. 6(b), the same human is detected three times at regular intervals. In this case, three "humans" are present in the box region of 10 m², and thus the number of humans per unit area (congestion degree) is calculated as follows: 3÷10=0.3. In this manner, in the present embodiment, the congestion degree calculation unit 206 calculates the congestion degree based on the number of humans (including the same human) integrated in the time axis direction for a predetermined time period, instead of calculating the congestion degree by counting the number of humans in a predetermined space at a certain instantaneous time.

FIG. 6(c) illustrates an example of blocking entities detected in each region of a plurality of regions (six box regions in the figure) with different distances in the front and back directions. In FIG. 6(c), for example, the number of humans in each box region calculated by using a method similar to that of FIG. 6(b) is counted as the number of humans (integrated number of humans) accumulated for a predetermined time period determined in advance, and this number of "humans" are regarded as being present in the plurality of box regions. In this case, the congestion degree can be calculated as in the following equation.

Congestion degree=(total number of humans in plurality of box regions)÷(areas of plurality of box regions)

In the example of FIG. 6(c), the total number of humans in the six box regions is 11. Further, the area of the six box regions is calculated as 10×(1×6)=60 m², on the condition that the long side of each box region is 10 m and the short side thereof is 1 m. Further, the number of humans per unit area (congestion degree) is calculated as follows: 11÷60=roughly 0.18. Here, the plurality of regions include a continuous region in which no "humans" are detected, and correspond to the entire target region from which the congestion degree is calculated.

In the manner described above, the estimation apparatus 101 according to the present embodiment can estimate the congestion degree of the blocking entities present between the transmitter Tx and the receiver Rx.

Next, processing procedures of the estimation method for the congestion degree in the estimation apparatus 101 described above will be described.

Figure 7:
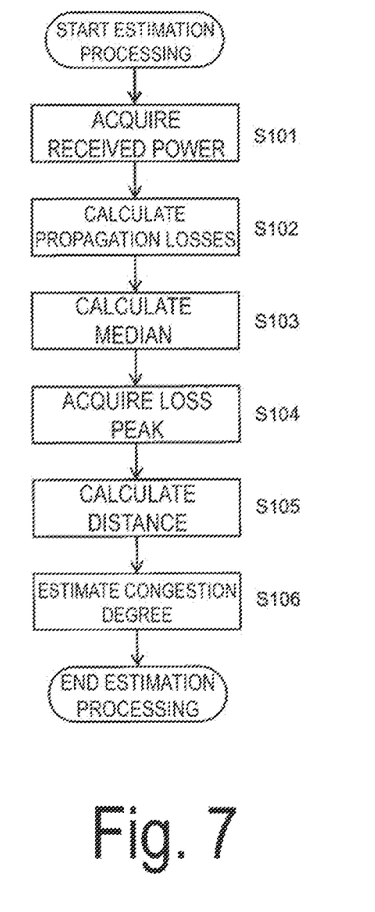
FIG. 7 is a diagram illustrating a flowchart of an estimation method for a congestion degree.

FIG. 7 illustrates a flowchart of the estimation method for the congestion degree. Note that the processing of FIG. 7 is executed by the estimation apparatus 101 described with reference to FIG. 2, for example.

In Step S101, the received power acquisition unit 201 acquires received power obtained when a radio signal transmitted from the transmitter Tx is received in the receiver Rx.

In Step S102, the propagation loss calculation unit 202 calculates propagation losses between the transmitter Tx and the receiver Rx.

In Step S103, the median processing unit 203 calculates a median of the propagation losses calculated by the propagation loss calculation unit 202 in a predetermined time period determined in advance.

In Step S104, the loss peak acquisition unit 204 acquires propagation losses having a maximum value out of the propagation losses in the predetermined time period output by the median processing unit 203.

In Step S105, the distance calculation unit 205 calculates a distance from the blocking entities, based on the maximum value of the propagation losses acquired by the loss peak acquisition unit 204.

In Step S106, the congestion degree calculation unit 206 stores data of the distances from the blocking entities calculated by the distance calculation unit 205 for a predetermined time period determined in advance, and calculates the number of blocking entities. Then, the congestion degree calculation unit 206 estimates the congestion degree of the blocking entities such as humans and vehicles between the transmitter Tx and the receiver Rx.

In this manner, in the estimation method for the congestion degree according to the present embodiment, the congestion degree between the transmitter Tx and the receiver Rx can be estimated by calculating the propagation losses due to the blocking entities such as humans and vehicles based on the received power of the receiver Rx through the use of radio communication between the transmitter Tx and the receiver Rx, calculating the distance between the transmitter Tx or the receiver Rx and the blocking entities, and calculating the number of the blocking entities in a predetermined time period.

Second Embodiment

Next, a method of estimating a congestion degree by using a method different from the estimation method for a congestion degree according to the first embodiment will be described.

Figure 8:
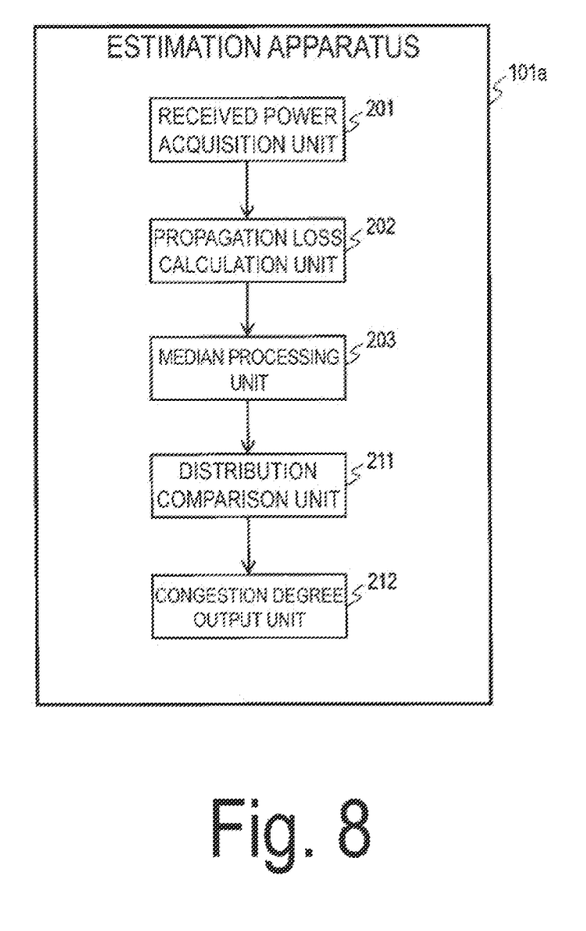
FIG. 8 is a diagram illustrating an example of an estimation apparatus according to a second embodiment.

FIG. 8 illustrates an example of an estimation apparatus 101a according to a second embodiment. The estimation apparatus 101a includes a received power acquisition unit 201, a propagation loss calculation unit 202, a median processing unit 203, a distribution comparison unit 211, and a congestion degree output unit 212. Here, the blocks denoted by the same reference signs as those of FIG. 2 are blocks that perform similar operations to those of the estimation apparatus 101 of FIG. 2, and thus overlapping description will be omitted.

The distribution comparison unit 211 acquires a plurality of pieces of distributed data indicating a relationship between the number of blocking entities per unit area and the propagation losses through actual measurement or simulation in advance, and stores the plurality of pieces of distributed data in an internal memory or the like. Then, the distribution comparison unit 211 calculates a distribution of the propagation losses, based on output results calculated by the median processing unit 203 in a predetermined time period determined in advance. Moreover, the distribution comparison unit 211 compares the calculated distribution with the plurality of pieces of distributed data stored in advance, and selects a piece of distributed data with the closest propagation losses.

Based on the piece of distributed data of the propagation losses selected by the distribution comparison unit 211, the congestion degree output unit 212 is capable of determining the number of blocking entities per unit area associated with the selected piece of distributed data, and thus outputs the determined number as the congestion degree of the blocking entities such as humans and vehicles between the transmitter Tx and the receiver Rx.

In this manner, the estimation apparatus 101a according to the present embodiment calculates the distributed data by calculating the propagation losses due to the blocking entities such as humans and vehicles based on the received power of the receiver Rx through the use of radio communication between the transmitter Tx and the receiver Rx, and compares the calculated distributed data with the plurality of pieces of distributed data, which are stored in advance, indicating a relationship between the number of blocking entities per unit area and the propagation losses obtained at the time, thereby allows for estimation of the congestion degree between the transmitter Tx and the receiver Rx.

Here, the estimation apparatus 101a according to the present embodiment is described as an apparatus including each of the blocks illustrated in FIG. 8. However, the estimation apparatus 101a can be implemented by a computer that executes a program corresponding to the processing performed by each of the blocks. Note that the program may be provided being recorded on a recording medium, or may be provided via a network.

Figure 9:
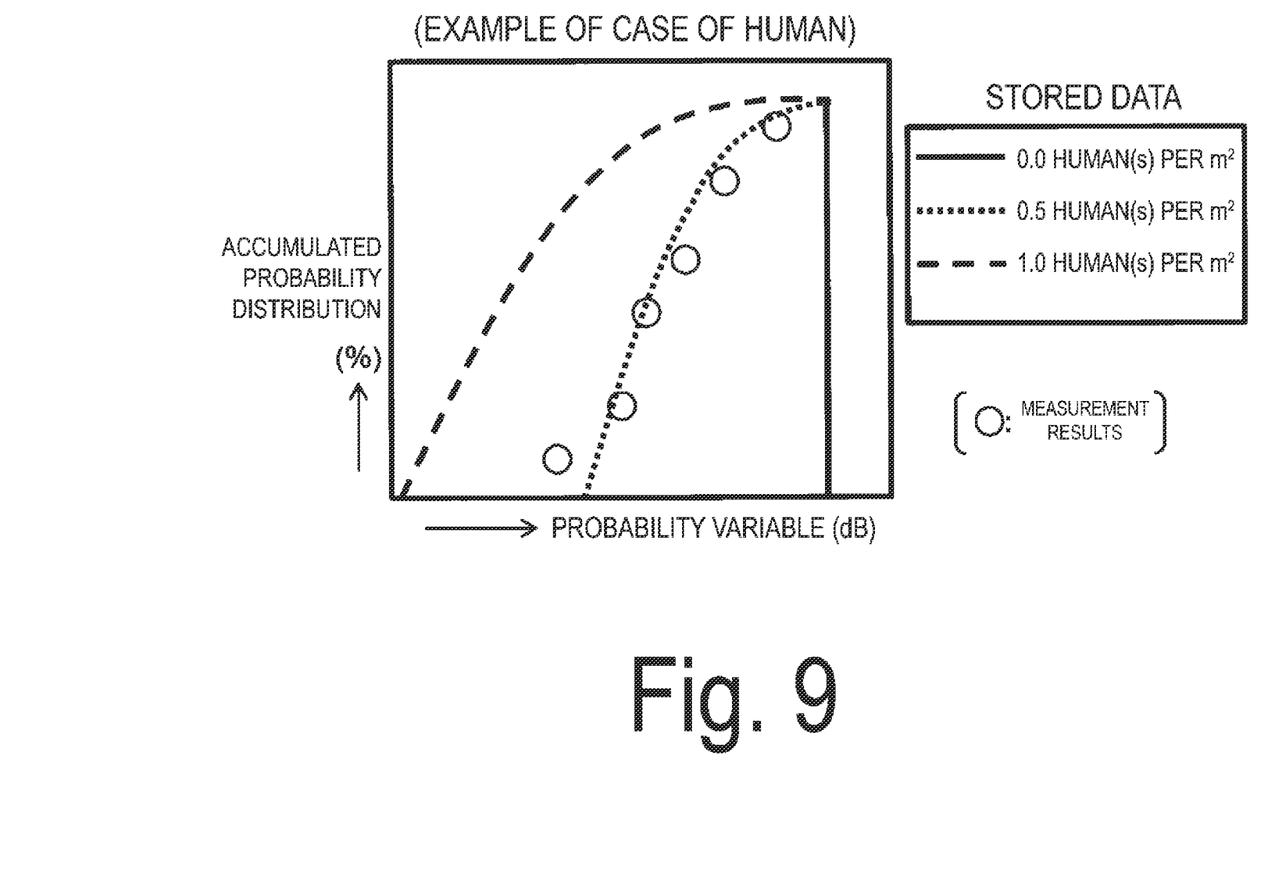
FIG. 9 is a diagram illustrating an example of a plurality of pieces of distributed data indicating a relationship between the number of blocking entities per unit area and propagation losses obtained at the time.

FIG. 9 illustrates an example of a plurality of pieces of distributed data indicating a relationship between the number of blocking entities per unit area and the propagation losses obtained at the time. In FIG. 9, the horizontal axis represents a probability variable [dB] of the propagation losses, and the vertical axis represents accumulated probability distribution [%]. FIG. 9 illustrates an example of a case in which the blocking entities are humans. The solid line indicates the distributed data when the number of humans per unit area (1 m$^2$) is 0, the dotted line indicates the distributed data when the number of humans per unit area (1 m$^2$) is 0.5, and the broken line indicates the distributed data when the number of humans per unit area (1 m$^2$) is 1.0.

In FIG. 9, measurement results of the propagation losses calculated by the median processing unit 203 are plotted with blank circles. In the example of FIG. 9, it can be understood that the measurement results have characteristics closest to the distributed data indicated by the dotted line which is acquired and stored in advance. Accordingly, the congestion degree output unit 212 can estimate that the congestion degree of the measurement results is the congestion degree (0.5 human(s) per m$^2$) that is associated with the distributed data indicated by the dotted line.

In this manner, the estimation apparatus 101a according to the present embodiment calculates the distributed data by calculating the propagation losses due to the blocking entities such as humans and vehicles based on the received power of the receiver Rx through the use of radio communication between the transmitter Tx and the receiver Rx, and compares the calculated distributed data with the plurality of pieces of distributed data acquired in advance, thereby allowing for estimation of the congestion degree between the transmitter Tx and the receiver Rx.

Next, processing procedures of the estimation method for the congestion degree in the estimation apparatus 101a described above will be described.

Figure 10:
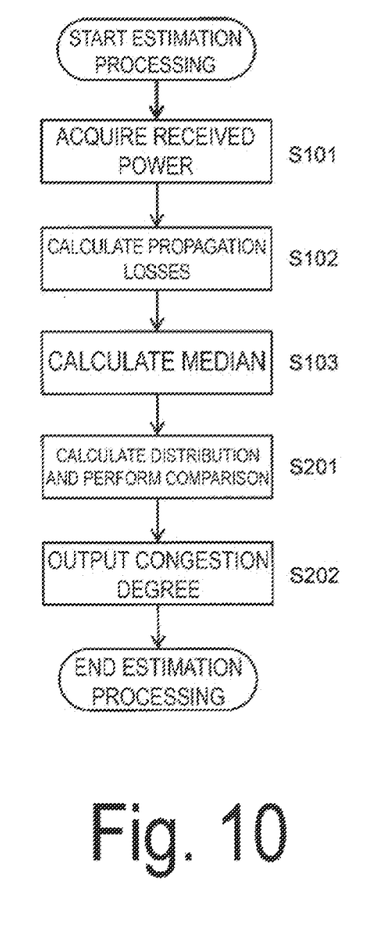
FIG. 10 is a diagram illustrating a flowchart of an estimation method for a congestion degree.

FIG. 10 illustrates a flowchart of the estimation method for the congestion degree. Note that the processing of FIG. 10 is executed by the estimation apparatus 101a described with reference to FIG. 8, for example. Note that the processing from Step S101 to Step S103 is the same as that of the flowchart of the estimation apparatus 101 described with reference to FIG. 7, and thus overlapping description will be omitted.

In Step S201, the distribution comparison unit 211 calculates distribution of the propagation losses based on output results calculated by the median processing unit 203 in a predetermined time period determined in advance, compares the calculated distribution with a plurality of pieces of distributed data with known congestion degrees stored in advance, and selects a piece of distributed data with the closest propagation losses.

In Step S202, based on the piece of distributed data of the propagation losses selected in the processing of Step S201, the congestion degree output unit 212 determines the number of blocking entities per unit area associated with the selected piece of distributed data, and outputs the determined number as the congestion degree of the blocking entities such as humans and vehicles between the transmitter Tx and the receiver Rx.

In this manner, in the estimation method for the congestion degree according to the present embodiment, the distributed data is calculated by calculating the propagation losses due to the blocking entities such as humans and vehicles based on the received power of the receiver Rx through the use of radio communication between the transmitter Tx and the receiver Rx, and the calculated distributed data is compared with the plurality of pieces of distributed data acquired in advance, thereby allowing for estimation of the congestion degree between the transmitter Tx and the receiver Rx.

As has been described in each of the embodiments in the above, the estimation method, the estimation apparatus, and the estimation program for the congestion degree according to the present invention allow for measurement of the congestion degree of the blocking entities such as humans and vehicles through the use of an existing radio communication system even in a high place where it is difficult to set a camera, a place where blocking entities cannot be detected using image recognition in view of protection of personal information, and the like.

REFERENCE SIGNS LIST

Estimation apparatus . . . 101, 101a
201 . . . Received power acquisition unit
202 . . . Propagation loss calculation unit
203 . . . Median processing unit
204 . . . Loss peak acquisition unit
205 . . . Distance calculation unit
206 . . . Congestion degree calculation unit
211 . . . Distribution comparison unit
212 . . . Congestion degree output unit

The invention claimed is:
1. An estimation method of estimating a congestion degree of blocking entities in a communication region between a transmitter and a receiver performing radio communication, the estimation method comprising:
  acquiring received power;
  calculating propagation losses between the transmitter and the receiver, based on the received power acquired in the acquiring of the received power;

calculating a median of a plurality of the propagation losses calculated in the calculating of the propagation losses in a predetermined time period determined in advance, and outputting the median as propagation losses to be used for subsequent processing;

acquiring a loss peak by acquiring a maximum value of the propagation losses output in the calculating of the median;

calculating a distance between the transmitter or the receiver and the blocking entities, at least based on the maximum value of the propagation losses acquired in the acquiring of the loss peak, heights of antennas of the transmitter and the receiver, and a wavelength of the radio communication; and calculating the congestion degree by estimating the congestion degree by calculating the number of the blocking entities in chronological order, based on the distance calculated in the calculating of the distance, integrating the number for a predetermined time period determined in advance, and thereby calculating the number of the blocking entities per unit area.

2. A non-transitory computer-readable medium having computer-executable instructions that, upon execution of the instructions by a processor of a computer, cause the computer to perform the steps according to claim 1.

\* \* \* \* \*